(12) United States Patent
Jackman et al.

(10) Patent No.: US 8,775,279 B2
(45) Date of Patent: Jul. 8, 2014

(54) PAYROLL RECEIPT USING A TRUSTEE ACCOUNT SYSTEMS AND METHODS

(75) Inventors: Richard Jackman, Collierville, TN (US); Mark Herrington, Memphis, TN (US); Mark V. Putman, Memphis, TN (US)

(73) Assignee: Money Network Financial, LLC, Cordova, TN (US)

( * ) Notice: Subject to any disclaimer, the term of this patent is extended or adjusted under 35 U.S.C. 154(b) by 1343 days.

(21) Appl. No.: 12/134,425

(22) Filed: Jun. 6, 2008

(65) Prior Publication Data

US 2008/0306844 A1 Dec. 11, 2008

Related U.S. Application Data

(60) Provisional application No. 60/942,612, filed on Jun. 7, 2007.

(51) Int. Cl.
*G07B 17/00* (2006.01)
*G07F 19/00* (2006.01)

(52) U.S. Cl.
USPC .......................................................... 705/30

(58) Field of Classification Search
USPC ............................................. 705/30, 1.1, 26
See application file for complete search history.

(56) References Cited

U.S. PATENT DOCUMENTS

| | | | |
|---|---|---|---|
| 4,256,955 A | 3/1981 | Giraud et al. |
| 4,321,672 A | 3/1982 | Braun et al. |
| 4,700,055 A | 10/1987 | Kashkashian, Jr. |
| 4,837,422 A | 6/1989 | Dethloff et al. |
| 4,900,903 A | 2/1990 | Wright et al. |
| 5,155,342 A | 10/1992 | Urano |
| 5,231,569 A | 7/1993 | Myatt et al. |
| 5,393,963 A | 2/1995 | Thomas et al. |
| 5,457,305 A | 10/1995 | Akel et al. |
| 5,483,445 A | 1/1996 | Pickering |

(Continued)

FOREIGN PATENT DOCUMENTS

| | | |
|---|---|---|
| EP | 0 540 234 A2 | 5/1993 |
| EP | 0 725 376 A2 | 8/1996 |
| WO | WO 97/43893 A1 | 11/1997 |

OTHER PUBLICATIONS

PCT International Search Report and Written Opinion mailed Sep. 25, 2008, International Application No. PCT/US2008/066317, 8 pages.

(Continued)

*Primary Examiner* — Seye Iwarere
(74) *Attorney, Agent, or Firm* — Kilpatrick Townsend & Stockton LLP (57) ABSTRACT

A payroll receiving and accessing system includes an enrollment kit. The kit includes activation instructions and an enrollment form for assigning an account identifier that identifies an account for receiving payroll funds due an employee. The system also includes an account activation system programmed to receive an activation request by the employee to activate the account, provide to the employee disbursement options including at least receiving payroll funds by negotiable instrument and receiving payroll funds by presentation instrument, receive from the employee a selection from among the disbursement options, and establish the selection. The system also includes a trustee account for the benefit of the employee for receiving the payroll funds due the employee and a system configured to disburse the funds to the employee in accordance with the selection.

19 Claims, 5 Drawing Sheets

(56) References Cited

U.S. PATENT DOCUMENTS

| | | | |
|---|---|---|---|
| 5,500,513 | A | 3/1996 | Langhans et al. |
| 5,513,102 | A | 4/1996 | Auriemma |
| 5,537,314 | A | 7/1996 | Kanter |
| 5,546,523 | A | 8/1996 | Gatto |
| 5,590,038 | A | 12/1996 | Pitroda |
| 5,613,012 | A | 3/1997 | Hoffman et al. |
| 5,614,703 | A | 3/1997 | Martin et al. |
| 5,621,640 | A | 4/1997 | Burke |
| 5,649,117 | A | 7/1997 | Landry |
| 5,650,604 | A | 7/1997 | Marcous et al. |
| 5,684,965 | A | 11/1997 | Pickering |
| 5,770,843 | A | 6/1998 | Rose et al. |
| 5,783,808 | A | 7/1998 | Josephson |
| 5,826,243 | A | 10/1998 | Musmanno et al. |
| 5,859,419 | A | 1/1999 | Wynn |
| 5,864,830 | A | 1/1999 | Armetta et al. |
| 5,873,072 | A | 2/1999 | Kight et al. |
| 5,897,625 | A | 4/1999 | Gustin et al. |
| 5,914,472 | A | 6/1999 | Foladare et al. |
| 5,920,847 | A | 7/1999 | Kolling et al. |
| 5,943,656 | A | 8/1999 | Crooks et al. |
| 5,953,710 | A | 9/1999 | Fleming |
| 5,970,480 | A | 10/1999 | Kalina |
| 5,978,780 | A | 11/1999 | Watson |
| 5,999,596 | A | 12/1999 | Walker et al. |
| 5,999,624 | A | 12/1999 | Hopkins |
| 6,012,048 | A | 1/2000 | Gustin et al. |
| 6,021,943 | A | 2/2000 | Chastain |
| 6,035,285 | A | 3/2000 | Schlect et al. |
| 6,044,360 | A | 3/2000 | Picciallo |
| 6,049,782 | A | 4/2000 | Gottesman et al. |
| 6,081,790 | A | 6/2000 | Rosen |
| 6,108,641 | A | 8/2000 | Kenna et al. |
| 6,128,599 | A | 10/2000 | Walker et al. |
| 6,128,602 | A | 10/2000 | Northington et al. |
| 6,128,603 | A | 10/2000 | Dent et al. |
| 6,226,623 | B1 | 5/2001 | Schein et al. |
| 6,292,789 | B1 | 9/2001 | Schutzer |
| 6,304,860 | B1 | 10/2001 | Martin, Jr. et al. |
| 6,311,170 | B1 | 10/2001 | Embrey |
| 6,327,577 | B1 | 12/2001 | Garrison et al. |
| 6,422,462 | B1 | 7/2002 | Cohen |
| 6,829,588 | B1* | 12/2004 | Stoutenburg et al. ........... 705/30 |
| 7,050,996 | B1 | 5/2006 | Blagg et al. |
| 7,076,465 | B1 | 7/2006 | Blagg et al. |
| 2001/0034676 | A1* | 10/2001 | Vasic ............................... 705/30 |
| 2002/0087467 | A1 | 7/2002 | Mascavage, III et al. |
| 2002/0156683 | A1 | 10/2002 | Stoutenburg et al. |
| 2002/0184148 | A1* | 12/2002 | Kahn et al. ...................... 705/40 |
| 2003/0061153 | A1* | 3/2003 | Birdsong et al. ................ 705/39 |
| 2003/0065618 | A1* | 4/2003 | VanDeBoe, Jr. ................ 705/40 |
| 2003/0093368 | A1 | 5/2003 | Manfre et al. |
| 2003/0187694 | A1* | 10/2003 | Rowen .............................. 705/2 |
| 2003/0197055 | A1* | 10/2003 | Ben-Aissa .................... 235/379 |
| 2003/0208445 | A1* | 11/2003 | Compiano ...................... 705/40 |
| 2003/0236746 | A1* | 12/2003 | Turner et al. .................... 705/40 |
| 2004/0015438 | A1* | 1/2004 | Compiano et al. .............. 705/40 |
| 2004/0030607 | A1 | 2/2004 | Gibson |
| 2004/0049436 | A1* | 3/2004 | Brand et al. ..................... 705/30 |
| 2004/0093278 | A1* | 5/2004 | Burchetta et al. ............... 705/26 |
| 2004/0111361 | A1* | 6/2004 | Griffiths et al. ................. 705/39 |
| 2005/0075974 | A1 | 4/2005 | Turgeon |
| 2005/0097034 | A1* | 5/2005 | Loeger et al. ................... 705/39 |
| 2005/0109833 | A1 | 5/2005 | Page |
| 2005/0116027 | A1 | 6/2005 | Algiene et al. |
| 2005/0125295 | A1 | 6/2005 | Tidwell et al. |
| 2005/0177496 | A1* | 8/2005 | Blagg et al. ..................... 705/39 |
| 2005/0192895 | A1* | 9/2005 | Rogers et al. ................... 705/39 |
| 2005/0197945 | A1* | 9/2005 | Harper ............................ 705/35 |
| 2006/0006224 | A1 | 1/2006 | Modi |
| 2006/0074765 | A1 | 4/2006 | Crawford et al. |
| 2006/0229964 | A1* | 10/2006 | Fox ................................. 705/35 |
| 2007/0057035 | A1 | 3/2007 | Jackman et al. |
| 2007/0061206 | A1* | 3/2007 | LeFebvre ........................ 705/14 |
| 2007/0112629 | A1* | 5/2007 | Solomon et al. ................ 705/14 |
| 2007/0198303 | A1* | 8/2007 | Long ................................. 705/4 |
| 2008/0021799 | A1* | 1/2008 | Blowers .......................... 705/30 |
| 2008/0067241 | A1 | 3/2008 | Jackman et al. |
| 2008/0114658 | A1* | 5/2008 | Weitzman ....................... 705/17 |
| 2008/0185427 | A1* | 8/2008 | Herrington et al. ........... 235/379 |
| 2008/0215488 | A1* | 9/2008 | Jackman et al. ................ 705/44 |
| 2008/0275773 | A1* | 11/2008 | Assadian ......................... 705/14 |
| 2009/0222367 | A1* | 9/2009 | Jenkins et al. .................. 705/35 |

OTHER PUBLICATIONS

Air Miles Service Center, "Terms & Conditions of the Air Miles® Reward Program," 1 page, May 1998.

Andrejczak, Matt, "Va. Bank Aims to Gain Accounts Through Pact With Debit Card Issuer," American Banker, vol. 164, No. 93, 2 pages, May 17, 1999.

Barish, William, "Debit Cards: A Personal Perspective," www.americanpayroll.org, pp. 18-20, Apr. 2002.

Brockman, Todd J., "Card-Based Payroll Solutions," www.americanpayroll.org, pp. 22-23, Apr. 2002.

Comdata Corporation, "Payroll & Electronic Funds Distribution Solutions: Eliminate the High-Cost of Paper Payroll Distribution," 1 page, 2006.

First Data Corp., "Tran$Pay Soon to Be the Western Union Pay Card," 1 page, no date.

Green, Lisbeth K., "Payroll Cards: How and Why to Make Them Work for Your Organization," www.americanpayroll.org, pp. 16-17 and 24, Apr. 2002.

IPS Card Solutions, Inc., "FDX-400 Remote Payroll Distribution," 1 page, 1998.

McEnaney, Maura, "Modular ATM Gives Boost to Diebold," Akron Beacon Journal, 3 pages, Jul. 12, 1997.

White, Ron, "How Computers Work," Fourth Edition, 38 pages, Sep. 1998.

* cited by examiner

PAYROLL RECEIPT USING A TRUSTEE ACCOUNT SYSTEMS AND METHODS

CROSS-REFERENCES TO RELATED APPLICATIONS

This application is a non-provisional, and claims the benefit, of co-pending, commonly assigned U.S. patent application Ser. No. 60/942,612, filed Jun. 7, 2007, entitled, "Payroll Receipt Using A Trustee Account Systems And Methods," the entirety of which is incorporated herein by reference.

This application is related to co-pending, commonly assigned U.S. patent application Ser. No. 11/223,441, filed Sep. 9, 2005, entitled "Enhanced Pre-Allocated Check Negotiability Systems And Methods"; U.S. patent application Ser. No. 11/834,457, filed Aug. 6, 2007, entitled "Payer-Based Account Porting To Portable Value Distribution Systems And Methods," which is a non-provisional, and claims the benefit, of U.S. Provisional Patent Application No. 60/821,485, filed Aug. 4, 2006, entitled "Employer-Based Account Porting To Portable Payroll Card Systems And Methods"; U.S. patent application Ser. No. 11/843,395, filed Aug. 22, 2007, entitled "Pre-Allocated Negotiable Instrument And Presentation Instrument Purchasing And Activation Systems and Methods," which is a non-provisional, and claims the benefit, of U.S. Provisional Patent Application No. 60/839,843, filed Aug. 23, 2006, entitled "Pre-Allocated Negotiable Instrument And Presentation Instrument Purchasing And Activation Systems And Methods"; U.S. patent application Ser. No. 11/558,874, filed Nov. 10, 2006, entitled "System And Method For Issuing Prepaid Negotiable Instruments"; and U.S. patent application Ser. No. 11/935,976, filed Nov. 6, 2007, entitled "Negotiable Instrument To Presentation Instrument Value Porting Systems And Methods," which is a non-provisional, and claims the benefit, of U.S. Provisional Patent Application No. 60/864,714, filed Nov. 7, 2006, entitled "Negotiable Instrument To Presentation Instrument Value Porting Systems And Methods," each of which are incorporated herein by reference in their entirety for all purposes.

FIELD OF THE INVENTION

Embodiments of the present invention relate generally to payroll distribution systems. More specifically, embodiments of the present invention relate to systems and methods for distributing payroll to employees using a trust account that provides receipt options for the employee.

BACKGROUND OF THE INVENTION

By some estimates, tens of millions of workers in the United States do not have a traditional banking relationship. This fact is driving increasing numbers of employers to assist their "unbanked" employees by establishing accounts into which employers may deposit funds and through which employees may access funds using presentation instruments (e.g., debit cards, stored value cards, ATM cards, smart cards or other storage mediums utilizing card numbers (e.g., RFID chips, and FOBS), etc., herein "cards") and other means.

Such accounts may have limitations and/or detriments. For example, employees may be constrained as to the means through which the employee may access the funds. Further, if the funds are still considered an asset of the employer or within the control of the employer, the funds may be subject to the ongoing business risk of the employer. For these and other reasons, alternative systems and methods are needed.

BRIEF SUMMARY OF THE INVENTION

Embodiments of the present invention provide a payroll receiving and accessing system. The system includes an enrollment kit. The kit includes activation instructions and an enrollment form for assigning an account identifier that identifies an account for receiving payroll funds due an employee. The system also includes an account activation system programmed to receive an activation request by the employee to activate the account, provide to the employee disbursement options including at least receiving payroll funds by negotiable instrument and receiving payroll funds by presentation instrument, receive from the employee a selection from among the disbursement options, and establish the selection. The system also includes a trustee account for the benefit of the employee for receiving the payroll funds due the employee and a system configured to disburse the funds to the employee in accordance with the selection. In some embodiments, the account comprises a pooled account that receives payroll funds due to a plurality of employees. The account may be a deposit-insured account.

Other embodiments provide a method of receiving payroll. The method includes enrolling an employee into a payroll system. Enrolling the employee includes assigning to the employee at least an account identifier that identifies an account for receiving payroll funds due the employee and providing activation instructions to the employee. The method also includes activating the account on behalf of the employee. Activating the account includes receiving an activation request from the employee to activate the account, providing to the employee disbursement options including at least receiving payroll funds by negotiable instrument and receiving payroll funds by presentation instrument, receiving from the employee a selection from among the disbursement options, and establishing the selection. The method also includes depositing payroll funds due the employee into the account. The account is a trustee account for the benefit of the employee. The method also includes disbursing at least a portion of the funds to the employee.

In some embodiments, disbursing at least a portion of the funds to the employee includes disbursing the funds in accordance with the selection. The method may include receiving an alternative selection from the employee and distributing at least a portion of the funds in accordance with the alternative selection. Enrolling the employee into the payroll distribution system also may include providing a supply of "fund on issue" negotiable instruments to the employee. Enrolling the employee into the payroll distribution system further may include providing one or more presentation instruments to the employee. The method also may include, after activating the account on behalf of the employee, providing to the employee in accordance with the selection either a negotiable instrument or a presentation instrument for receiving disbursements of or accessing the payroll funds. The presentation instrument may be a debit card, automated teller machine card, stored value card, e-wallet, cell phone, RFID chip, FOB, draft, "fund on issue" negotiable instrument, and/or the like. The selection may include receiving payroll funds by negotiable instrument, in which case the method may include providing a supply of "fund on issue" negotiable instruments to the employee, receiving a request from the employee to receive an amount of the payroll funds using one of the negotiable instruments, providing to the employee an activation number, and segmenting the amount of the payroll funds from the payroll funds. The selection may include receiving or utilizing payroll funds by presentation instrument, in which case the method may include providing a presentation instrument to the employee, receiving a preauthorization request for a portion of the payroll funds via an electronic network, confirming the availability of the portion of the funds, and responding to the request accordingly. The account may be a pooled account. The account may be at a deposit-insured institution.

Still other embodiments provide a payroll receiving system. The system includes enrolling means for enrolling an employee into a payroll system. The enrolling means includes means for assigning to the employee at least an account identifier that identifies an account for receiving payroll funds due the employee and means for providing activation instructions to the employee. The system also includes activating means for activating the account on behalf of the employee. The activating means includes means for receiving an activation request from the employee to activate the account, means for providing to the employee disbursement options including at least receiving payroll funds by negotiable instrument and receiving payroll funds by presentation instrument, means for receiving from the employee a selection from among the disbursement options, and means for establishing the selection. The system also includes depositing means for depositing payroll funds due the employee into the account. The account includes a trustee account for the benefit of the employee. The system also includes means for disbursing at least a portion of the funds to the employee.

In some embodiments the means for enrolling the employee into the payroll distribution system includes means for providing a supply of "fund on issue" negotiable instruments to the employee. The means for enrolling the employee into the payroll distribution system may include means for providing one or more presentation instruments to the employee. The payroll receiving system also may include means for providing a supply of "fund on issue" negotiable instruments to the employee, means for receiving a request from the employee to receive an amount of the payroll funds using one of the negotiable instruments, means for providing to the employee an activation number, and means for segmenting the amount of the payroll funds from the payroll funds. The system also may include means for providing a presentation instrument to the employee, means for receiving a preauthorization request for a portion of the payroll funds via an electronic network, means for confirming the availability of the portion of the funds, and means for responding to the request accordingly.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The present invention relates to systems and methods for receiving wages, payroll, earned compensation, and/or the like (herein "payroll") by employees. Using the systems and methods described herein, employees may receive and access their payroll funds as cash or checks and/or receive the benefit of payroll funds using presentation instruments. It is to be understood that references herein to distribution of payroll by an employer are to be construed broadly to include receipt of the associated payroll funds and/or the benefit thereof by the employee. The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, structures and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Moreover, as disclosed herein, the term "presentation instrument" may represent one or more methods, devices, instruments for accessing funds, including cards (as defined above), e-wallets, cell phones and checks (as defined below), as well as other embodiments utilizing a card or account number or identifier.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

According to embodiments of the invention, an employee having no traditional banking relationship with a financial institution (herein an "unbanked" employee), or an employee simply desirous to have payroll funds deposited into an account providing multiple receipt options, enrolls, either with his employer or through other available channels, into the payroll distribution system described herein. Upon enrollment, the employee receives an account identifier and account activation instructions. The employee may receive the account identifier and account activation instructions from his or her employer or may receive it through other channels, such as a provider or reseller of the services described herein. The account identifier may be, for example, an ABA (American Bankers Association) routing number, account number, and/or the like, so that the employer may thereafter "direct deposit" the employee's funds. In some embodiments, the employee may receive one or more cards or other presentation instrument (as defined above) and/or a supply of negotiable instruments (e.g., drafts, "fund on issue" negotiable instruments, etc., herein "checks") to thereafter use for obtaining payroll disbursements and/or accessing and utilizing payroll funds. One or both may be provided in accordance with a selection by the employee of how the employee desires to receive payroll funds.

Enrollment may include providing the employee with a "kit" having any necessary enrollment materials, including a plan description, enrollment form, an account password, a temporary card, a supply of checks, and/or the like. Activation instructions may direct the employee to an IVR (interactive voice response unit), web site, or the like to activate the account.

Figure 1A:
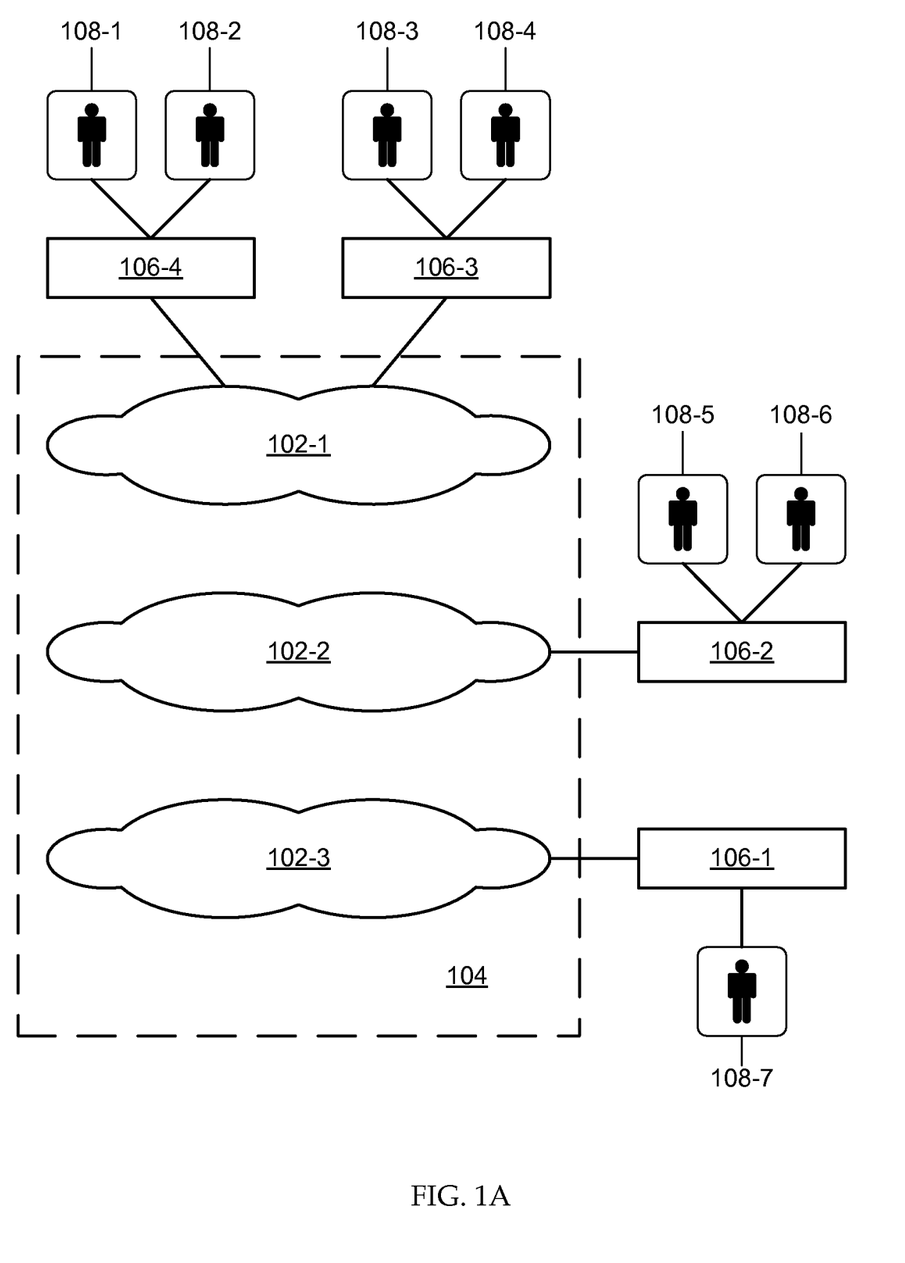
FIG. 1A depicts an exemplary payroll distribution structure according to embodiments of the present invention.

Once an employee is enrolled, the employer deposits payroll funds due the employee using the account identifier. The funds are deposited into an insured trust account for the benefit of the employee. For example, the account may be a FDIC (Federal Deposit Insurance Corporation)-insured account at a financial institution providing trust account services. As depicted in FIG. 1A, a trust account 102 at a federally-insured financial institution 104 may receive payroll deposits from a single employer 106-1, 106-2 or multiple employers 106-3, 106-4. A single account 120-3 may be created for each employee 108-7, or a single account 102-2, 102-1 may be used for multiple employees.

To activate the account, the employee may be directed to create a permanent password, provide personal information (social security number, address, etc.), select a disbursement method if the employee has not already done so, and/or the like. Thereafter, the employee may be provided with a personalized card and/or personalized checks.

Once the employee has activated the account and the employer has deposited funds into the account, the employee may receive disbursements of the fund in whatever increments the employee chooses and in accordance with the employee's selection of a preferred method for receiving funds. The employee also may be able to change his selection option and receive funds in any form or forms the employee chooses from among the available options.

Figure 1B:
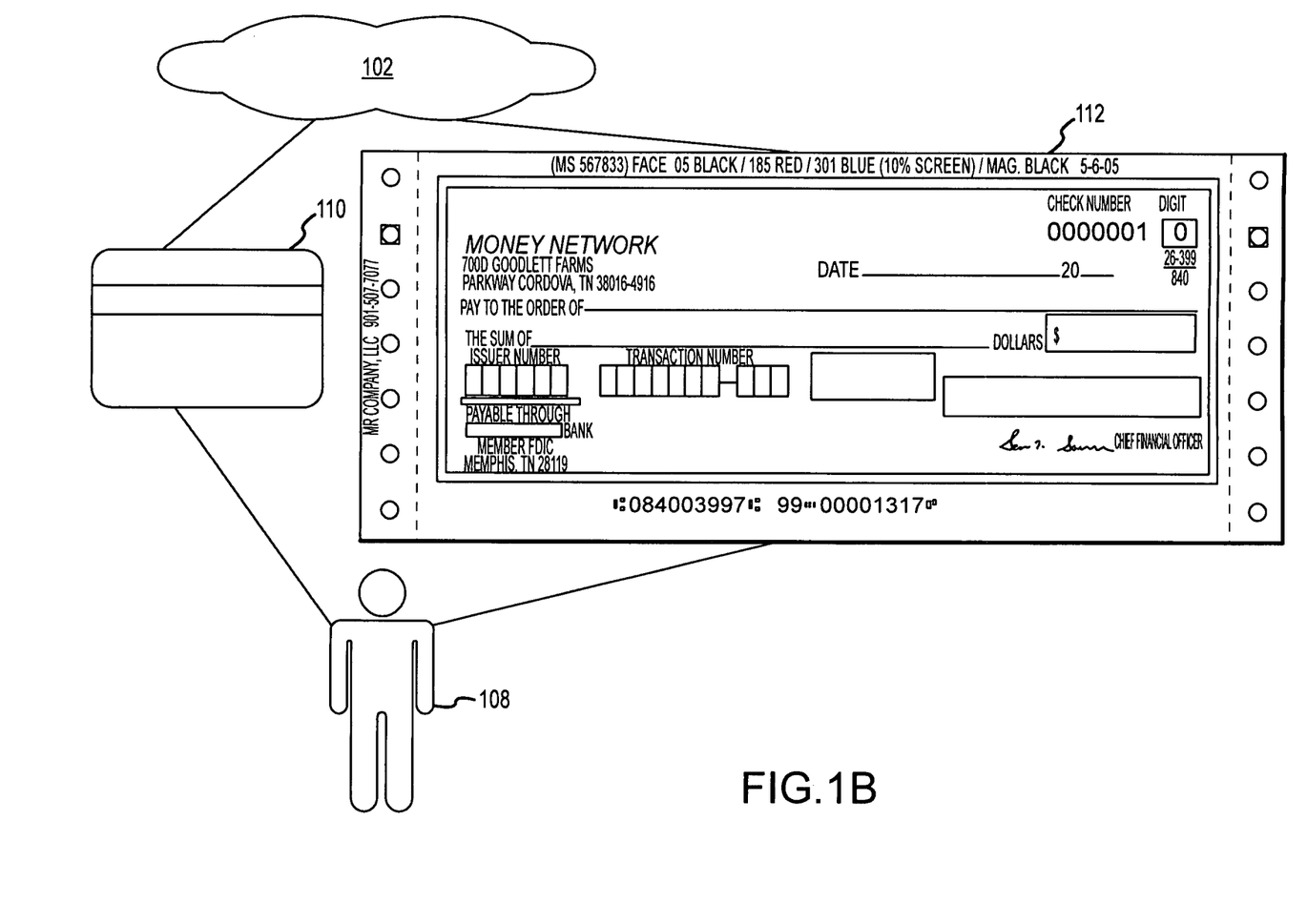
FIG. 1B depicts an exemplary payroll receipt structure according to embodiments of the present invention.

The options by which an employee may receive the benefits of payroll funds are virtually unlimited. Directing attention to FIG. 1B, using a presentation instrument 110 or check 112, an employee 108 may purchase items from merchants, withdraw funds at an ATM, receive cash from retailers who provide such a service, pay bills using an account number associated with a card, transfer money to another person or to other presentation instruments and the like. Using checks, an employee may pay bills by mail, cash checks wherever such a service is provided, deposit funds by check into a bank account, and the like. Checks, however, may require individual authorization by contacting an IVR or web site.

Some embodiments allow employees to advantageously use the account to receive payroll funds from a different employer than the one who enrolled the employee originally. Hence, the account may be "portable."

Figure 2:
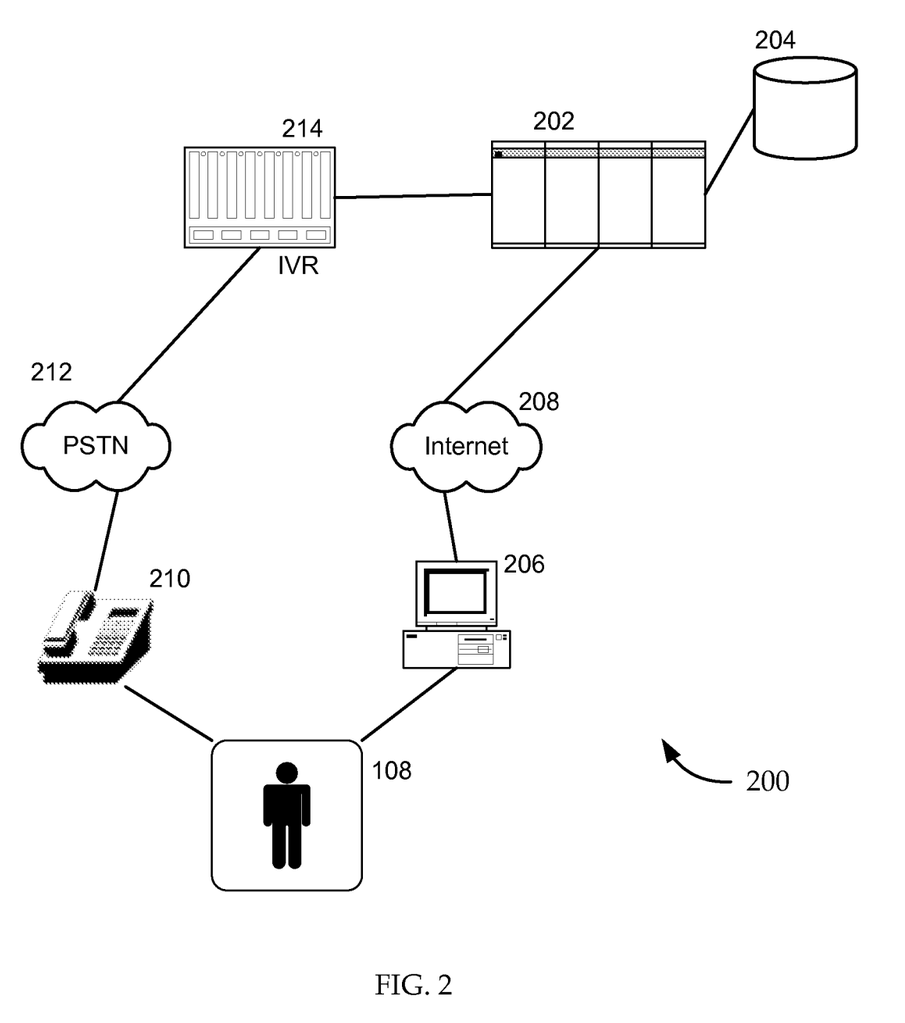
FIG. 2 depicts an exemplary payroll distribution system according to embodiments of the present invention.

Having described embodiments of the present invention generally, attention is directed to FIG. 2, which depicts an exemplary system 200 in which embodiments of the present invention may be implemented. Those skilled in the art will appreciate that the system 200 is merely exemplary of a number of different possible embodiments. The system 200 includes a host computer system 202 and associated storage arrangement 204. The host computer system 202 may be located at a financial institution providing account services for the payroll distribution system or may be located at the location of a service provider which provides employee account details to a financial institution at which payroll deposits are received. The host computer 202 may be a single computing device or a plurality of distributed devices located at different locations.

An employee 108 may be able to interact with the host computer system 202 through a variety of channels, two of which are depicted. For example, the employee 108 may use a personal computer 206 to communicate with the host via the Internet 208. Alternatively, the employee may use a telephone 210 to communicate via the PSTN (Public Switched Telephone Network) 212 with an IVR 214. Other exemplary channels through which the employee may interact with the host computer system include cell phones, kiosks, point-of-sale devices, and the like. Using either method, a record is created for the employee by the host computer system 202 and stored on the storage arrangement. The record maintains personal details, account balances, disbursement selection options, and the like for the employee.

Figure 3A:
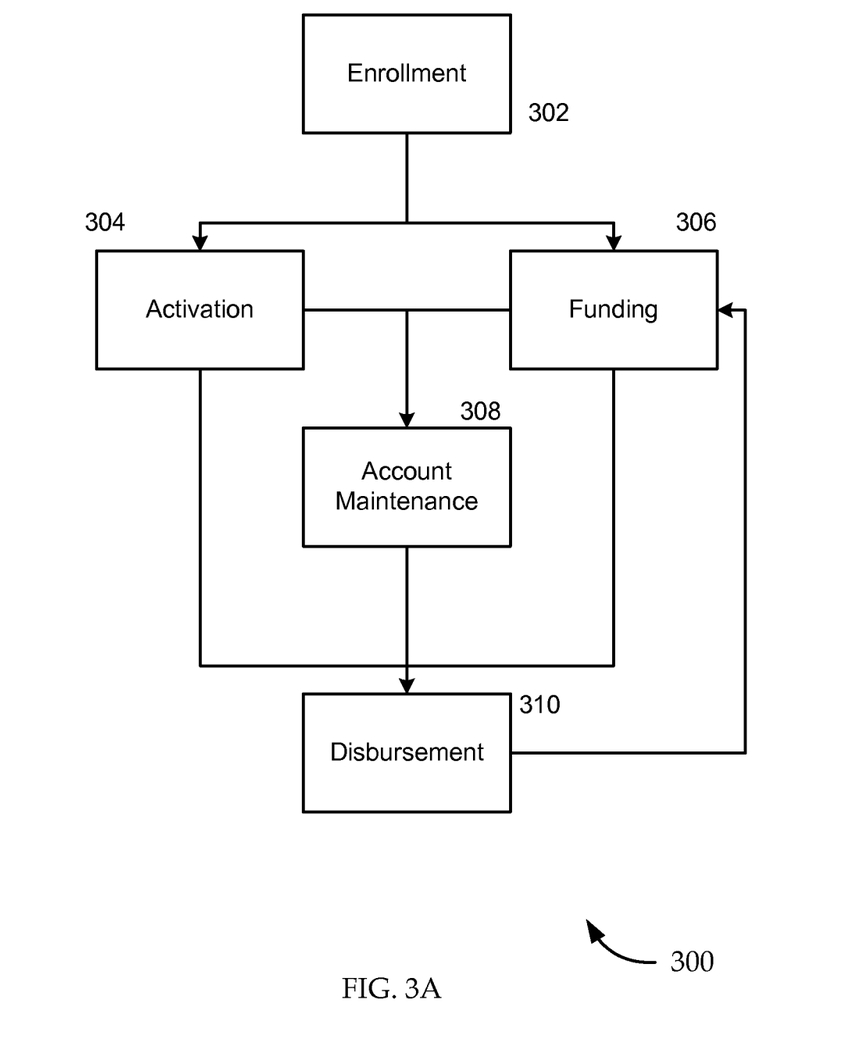
FIG. 3A depicts an exemplary payroll distribution method according to embodiments of the present invention, which method may be implemented in the system of FIG. 2.
Figure 3B:
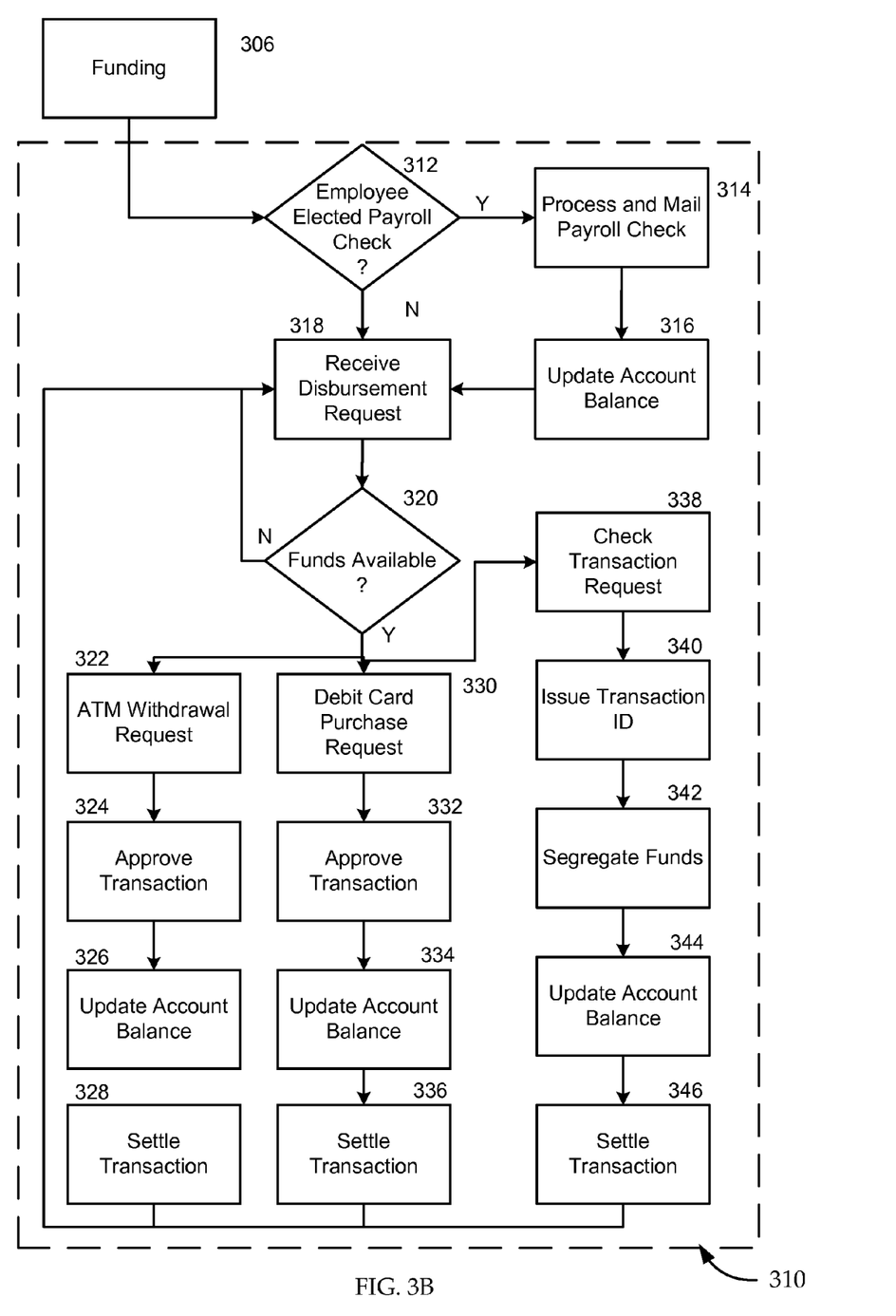
FIG. 3B depicts an exemplary payroll disbursement method according to embodiments of the invention.

Having described an exemplary system according to embodiments of the invention, attention is directed to FIGS. 3A and 3B, which depict exemplary methods according to embodiments of the invention. The methods may be implemented in the system 200 of FIG. 2 or in another appropriate systems. Those skilled in the art will appreciate that the methods are merely exemplary of a number of possible methods according to embodiments of the invention. Other methods according to other embodiments may include more, fewer, or different steps than those illustrated and described herein and/or may be traversed in different orders than described and illustrated herein.

FIG. 3A depicts a high-level method 300 of distributing payroll to an employee according to embodiments of the invention. The method begins at block 302, at which point the employee is enrolled into the payroll system, which may be the system 200 described above. Enrollment may include providing an enrollment kit to the employee, having the employee complete an enrollment form, providing the employee with activation instructions, providing the employee with a temporary password, temporary checks, a temporary card, and/or the like. Associated with the enrollment kit is an account identifier, which may include an ABA routing number, account number, card number, and the like, which the employee may use to receive payroll funds and which an employer may thereafter use to deposit the employee's funds. Conveniently, if the employee is unbanked, once the employee is enrolled into the payroll distribution system according to some embodiments, the employee may thereafter be treated as other banked employees of the employer for payroll distribution purposes. For example, the employer may "direct deposit" payroll funds due the employee just as payroll funds are deposited for other banked employees into DDAs (direct deposit accounts).

At block 304, the employee activates his account. This may be accomplished by calling an IVR using a telephone and stepping through guided prompts. Or activation may be accomplished by calling a customer service representative (CSR). Activation also may be accomplished using a personal computer and visiting a web site. Other possibilities exist.

Activation may include any of a number of actions. For example, the employee may be asked to select a permanent password to replace the temporary password assigned during enrollment. This password may be different than a password associated with the employee's card, which may be mailed to the employee following activation. The employee may be asked to provide an address and/or other contact information. Activation also may include providing to the employee various options for receiving payroll funds and asking the employee to select an option or options. For example, the employee may be allowed to receive a portion of the funds in the form of a payroll check which may be mailed to the employee once payroll funds due the employee are deposited by the employer. The employee also may select to have a portion of funds available using a card, which may function as an ATM card, debit card, and/or the like. The employee also may select to have a portion of the funds available using fund-on-issue checks provided to the employee. In a specific embodiment, the employee may be provided the option to have some portion of his payroll funds available using all options. Activation also may include sending the employee a personally embossed card and/or a supply of personalized checks.

At block 306, the employee's account is funded with payroll, wages, or other compensation ("payroll funds") due the employee. In other examples, an employee may be able to load additional funds to the account or create an account for other people. The funds may be pooled with the payroll funds due other employees, possibly employees of other employers. The account may be funded by the employer, directly into a trust account as previously stated, or the employer may send the funds to an agent, custodian, or trustee for deposit into the trust account. Either way, the funds are deposited into an insured trust account for the benefit of the employee. Hence, the employer has parted with beneficial use of the funds, and the employee receiving the funds is no longer subject to the business risk of the employer or the trustee. Further, because the account is insured, the employee's funds are not subject to the risk of the financial institution.

At block 308, the employee may perform account maintenance on the account. This may include changing passwords, updating address information, changing distribution options, and/or the like. Account maintenance may be accomplished by contacting a CSR, calling an IVR, visiting a web site and/or the like.

At block 310, funds are disbursed to the employee. This may be include mailing a payroll check to the employee for a portion of the funds, authorizing purchases using a debit card, authorizing withdrawals from ATMs, providing funds via fund-on-issue checks, and or the like. For example, the employee may have a fixed amount or a fixed percentage of each payroll deposit provided to the employee in the form of a payroll check. The remaining balance may be available using the card. At any point in time, the employee may request, via IVR, CSR, web site, or the like, to have a portion of the funds made available using one of the supplied checks. The employee receives a transaction identifier to write on one of the supplied blank checks, and the funds are segregated to ensure availability once the check is tendered. Provide a sufficient balance remains, the employee may continue writing checks and or using the card. Any remaining balance is available to the employee for use of presentation instruments, including via purchases using the card, withdrawals using an ATM, and/or the like, purchases using an identifier associated with the account via cell phones, the Internet, card-not-present transactions, an e-wallet, and/or the like. A more detailed description of the disbursement process follows immediately herein after.

FIG. 3B depicts the disbursement block 310 in greater detail. Upon funding at block 306, a determination is made at block 312 whether the employee elected to receive some or his entire payroll as a payroll check. If so, the payroll check is processed and mailed at block 314 and the account balance is updated at block 316. If the employee did not elect to receive a payroll check or after the check is processed, the process continues at block 318.

At block 318, a disbursement request is received. A determination is then made at block 320 whether funds are available to cover the disbursement request. If not, the process continues back at block 318. If so, the process continues in accordance with the type of request received.

If the disbursement request is in the form of an ATM withdrawal, then the process continues at block 322. The transaction is approved at block 324, the account balance is updated at block 326, and the transaction is settled at block 328. The process then continues back to block 318.

If the disbursement request is in the form of a card transaction, then the process continues at block 330. The transaction is approved at block 332, the account balance is updated at block 334, and the transaction is settled at block 336. The process then continues back to block 318.

If the disbursement request is in the form of a check transaction, then the process continues at block 338. A transaction identifier is provided to the employee at block 340, which the employee enters on one of the fund-on-issue check provided to the employee upon enrollment or activation. The funds requested are segregated at block 342, the account balance is updated at block 344, and the transaction is settled at block 346. The process of authorizing and processing checks is described more fully in previously-incorporated U.S. patent application Ser. No. 11/223,441. The process then continues back to block 318.

Those skilled in the art will appreciate that the foregoing disbursement method is merely exemplary of a number of possible disbursements according to embodiments of the invention.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. Accordingly, the above description should not be taken as limiting the scope of the invention, which is defined in the following claims.

What is claimed is:

1. A payroll receiving and accessing system, comprising:
   an enrollment kit comprising:
      activation instructions; and
      an enrollment form for assigning an account identifier that identifies an account for receiving payroll funds due an employee;
      at least one temporary check and a temporary card;
   an account activation system having a computer processor that is programmed to:
      receive an activation request by the employee to activate the account;
      provide to the employee disbursement options including at least one option for receiving payroll funds both by negotiable instrument and by presentation instrument;
      receive from the employee a selection from among the disbursement options; and
      establish the selection;
   the account, wherein the account is a trustee account for the benefit of the employee for receiving the payroll funds due the employee; and
   a disbursement system configured to disburse the funds to the employee in accordance with the selection and to provide to the employee disbursement of a personalized presentation instrument a negotiable instrument, wherein the negotiable instrument identifies the employee as a drawer on the negotiable instrument.

2. The payroll receiving and accessing system of claim 1, wherein the account comprises a pooled account that receives payroll funds due to a plurality of employees.

3. The payroll receiving and accessing system of claim 1, wherein the account comprises a deposit-insured account.

4. A method of receiving payroll, comprising:
   enrolling an employee into a payroll system, wherein enrolling comprises:
   assigning to the employee at least an account identifier that identifies an account for receiving payroll funds due the employee; and
   providing activation instructions to the employee;
   providing to the employee at least one temporary check and a temporary card;
   activating the account on behalf of the employee using an account activation system having a computer processor, wherein activating the account comprises:
      receiving at the account activation system an activation request from the employee to activate the account;
      providing to the employee disbursement options including at least one option for receiving payroll funds both by negotiable instrument and by presentation instrument, wherein the employee disbursement options are provided using the computer processor;
      receiving from the employee a selection from among the disbursement options; and
      establishing the selection using the computer processor;
   depositing payroll funds due the employee into the account, wherein the account comprises a trustee account for the benefit of the employee; and
   disbursing at least a portion of the funds to the employee;
   providing to the employee a personalized presentation instrument and a negotiable instrument, wherein the negotiable instrument identifies the employee as a drawer on the negotiable instrument.

5. The method of claim 4, wherein disbursing at least a portion of the funds to the employee comprises disbursing the funds in accordance with the selection.

6. The method of claim 4, the method further comprising:
   receiving an alternative selection from the employee; and
   distributing at least a portion of the funds in accordance with the alternative selection.

7. The method of claim 4, wherein enrolling the employee into the payroll distribution system further comprises providing a supply of "fund on issue" negotiable instruments to the employee.

8. The method of claim 4, wherein enrolling the employee into the payroll distribution system further comprises providing one or more presentation instruments to the employee.

9. The method of claim 4, the method further comprising, after activating the account on behalf of the employee, providing to the employee in accordance with the selection either a negotiable instrument or a presentation instrument for receiving disbursements of or accessing the payroll funds.

10. The method of claim 4, wherein the presentation instrument comprises a selection from the group consisting of debit card, automated teller machine card, stored value card, e-wallet, cell phone, RFID chip, FOB, draft, and "fund on issue" negotiable instrument.

11. The method of claim 4, wherein the selection comprises receiving payroll funds by negotiable instrument, the method further comprising:
   providing a supply of "fund on issue" negotiable instruments to the employee;
   receiving a request from the employee to receive an amount of the payroll funds using one of the negotiable instruments;
   providing to the employee an activation number; and
   segmenting the amount of the payroll funds from the payroll funds.

12. The method of claim 4, wherein the selection comprises receiving or utilizing payroll funds by presentation instrument, the method further comprising:
   providing a presentation instrument to the employee;
   receiving a preauthorization request for a portion of the payroll funds via an electronic network;
   confirming the availability of the portion of the funds; and
   responding to the request accordingly.

13. The method of claim 4, wherein the account comprises a pooled account.

14. The method of claim 4, wherein the account is comprised by a deposit-insured institution.

15. A payroll receiving system, comprising:
   enrolling means for enrolling an employee into a payroll system, wherein the enrolling means comprises:
   means for assigning to the employee at least an account identifier that identifies an account for receiving payroll funds due the employee; and
   means for providing activation instructions to the employee;
   at least one temporary check and a temporary card;
   means for activating the account on behalf of the employee, wherein the activating means comprises:
   a computer processor;
   means for receiving an activation request from the employee to activate the account;

means for providing to the employee disbursement options including at least one option for receiving payroll funds both by negotiable instrument and by presentation instrument;

means for receiving from the employee a selection from among the disbursement options; and means for establishing the selection;

depositing means for depositing payroll funds due the employee into the account, wherein the account comprises a trustee account for the benefit of the employee; and means for disbursing at least a portion of the funds to the employee;

a personalized presentation instrument and a negotiable instrument, wherein the negotiable instrument identifies the employee as a drawer on the negotiable instrument.

16. The payroll receiving system of claim 15, wherein the means for enrolling the employee into the payroll distribution system includes means for providing a supply of "fund on issue" negotiable instruments to the employee.

17. The payroll receiving system of claim 15, wherein the means for enrolling the employee into the payroll distribution system includes means for providing one or more presentation instruments to the employee.

18. The payroll receiving system of claim 15, further comprising:

means for providing a supply of "fund on issue" negotiable instruments to the employee;

means for receiving a request from the employee to receive an amount of the payroll funds using one of the negotiable instruments;

means for providing to the employee an activation number; and means for segmenting the amount of the payroll funds from the payroll funds.

19. The payroll receiving system of claim 15, further comprising:

means for providing a presentation instrument to the employee;

means for receiving a preauthorization request for a portion of the payroll funds via an electronic network;

means for confirming the availability of the portion of the funds; and means for responding to the request accordingly.

* * * * *